Feb. 10, 1970 M. MARCHAL ET AL 3,495,148
DIRECT CURRENT ROTARY ELECTRIC MACHINES
Filed June 10, 1966 4 Sheets-Sheet 4
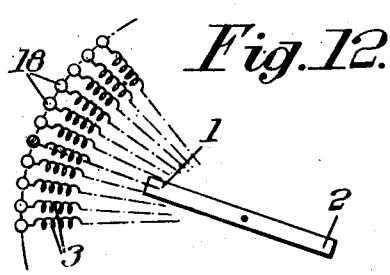
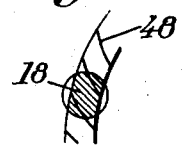
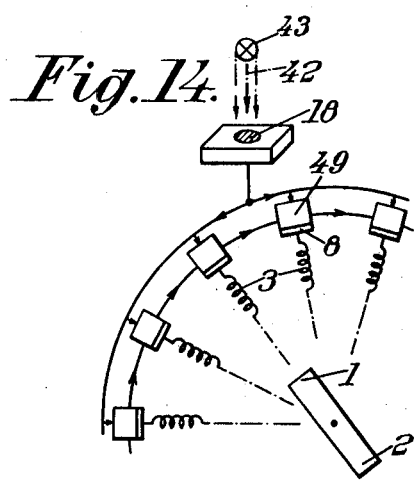

United States Patent Office 3,495,148
Patented Feb. 10, 1970

1

3,495,148
DIRECT CURRENT ROTARY ELECTRIC MACHINES
Maurice Marchal and Maurice Pilato, Paris, France, assignors to Centre National de la Recherche Scientifique, Paris, France, a French government administration
Filed June 10, 1966, Ser. No. 556,709
Claims priority, application France, June 11, 1965, 20,351; Oct. 27, 1965, 36,432; Feb. 23, 1966, 50,687
Int. Cl. H02k 29/02
U.S. Cl. 318—138  4 Claims

ABSTRACT OF THE DISCLOSURE

The stator carries star-connected windings which are each connected in series with a corresponding transistor and a first source of direct current. The base of each transistor is temporarily connected to a source of direct current smaller than the first source by means of an element, whose impedance varies in response to radiation, controlled from a distance by a beam of radiation. There are from ten to one hundred of these elements, disposed on a common circle on the stator, and the radiation beams scans them successively.

---

The present invention relates to direct current rotary electric or dynamo-electric machines (motors and dynamos).

The chief object of this invention is to eliminate or at least to reduce the sparks produced in such machines during their operation between their discontinuous collector rings and the brushes that rub against said rings.

It consists chiefly in mounting each of the windings of such a machine (which windings are preferably mounted in star-like fashion, that is to say have all a common point, and disposed in star-like fashion) in series with a semi-conductor element, such as a power transistor having three electrodes, to wit an input electrode, an output electrode and a control electrode, in connecting the control electrode of said element to a first source of direct current in an intermittent manner at a frequency equal to, or a multiple of the frequency of revolution of the rotor of the machine and in permanently connecting the two other electrodes either to a second source of direct current if the machine is a motor or to an exploitation circuit if the machine is a dynamo, the connection established during a portion of every revolution of the rotor between every control electrode and the first source of direct current being preferably ensured either by means of a discontinuous collector ring and a brush rubbing against said ring, or by the temporary variation of the impedance of an element mounted in series with this electrode, which modification is controlled from a distance by a beam of an immaterial radiation, the different elements sensitive to this radiation being disposed along a circle.

Prefered embodiments of the present invention will be hereinafter described with reference to the appended drawings, given merely by way of example, and in which:

FIG. 1 diagrammatically shows a known direct current motor fed by means of a collector ring or slip ring;

FIG. 2 diagrammatically shows a direct current motor made according to the present invention, and feed being produced through two uninterrupted rings and a small collector ring;

2

Figure 8:
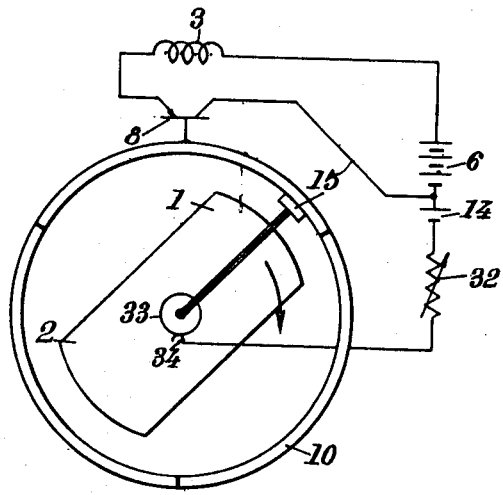
Figure 9:
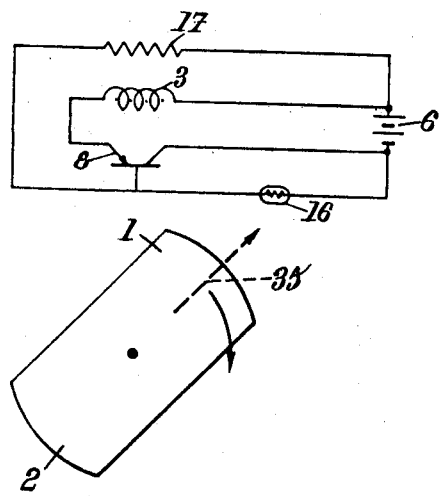
Figure 10:
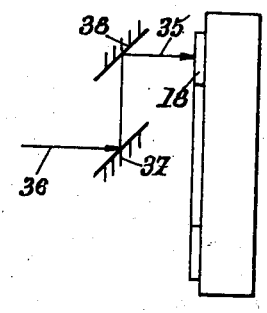
Figure 11:
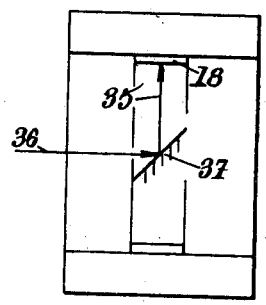

FIGS. 8 and 9 diagrammaticaly show two other motors made according to the invention wherein the windings are mounted on the stator, the magnetic field being produced by a permanent magnet mounted on the rotor, the selective feed of the respective windings taking place, in the case of FIG. 8, through a rotary brush and a small collector ring and, in the case of FIG. 9, by a rotating beam of rays;

FIGS. 10 and 11 diagrammatically show two methods for producing such a rotating beam;

FIG. 12 is a diagrammatical view of an electric motor working as a synchro-transmitter according to the invention;

FIG. 13 shows a detail of a modification of such a synchro-transmitter;

FIG. 14 diagrammatically shows a portion of another electric motor working in discontinuous manner to form a counter according to the invention.

Figure 1:
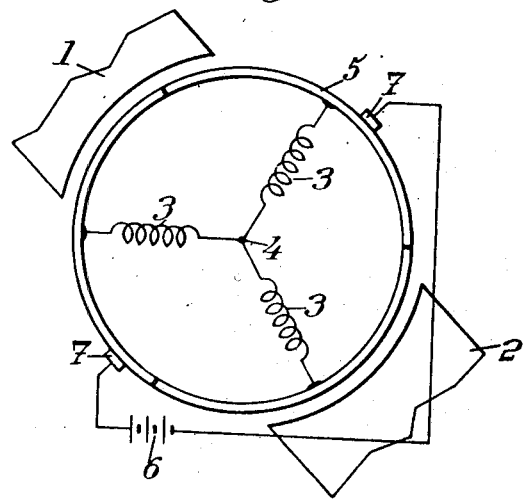

For a good understanding of the invention, we have shown in FIG. 1 a conventional direct current motor.

The rotor of this motor is placed in the magnetic field created by two fixed poles 1 and 2 and the motor essentially includes three windings 3 having a common point 4, the end of each of these windings opposed to this common point 4 being connected with one of the sectors of a collector or slip ring 5. The direct current from a fixed external source 6 is transmitted to these sectors through brushes 7 resiliently applied against them.

When one of these sectors is replaced by the next one in front of a brush 7, sparks are produced opposite this brush, said sparks being the stronger as the intensity of the current that is transmitted is higher.

These sparks have several drawbacks. In particular they cause deterioration of the surfaces between which they are produced and they are dangerous or even cannot be accepted in some medii.

The present invention permits of considerably reducing these sparks and even of eliminating them.

Figure 2:
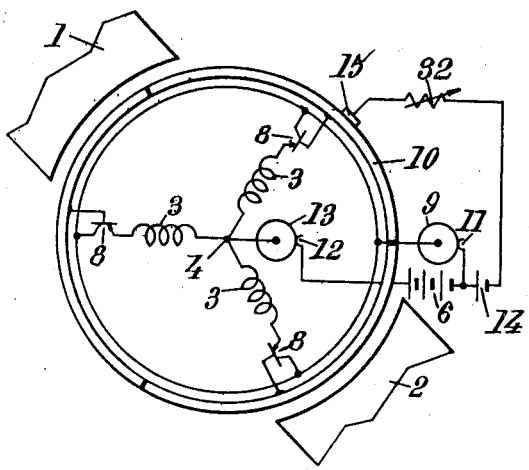

The first embodiment of the invention, diagrammatically shown by FIG. 2, permits of reducing said sparks. By way of indication the intensity of the current to which these sparks are due may be divided by several hundreds by making use of a transistor associated with every winding and by several tens of thousands by making use of a series of two transistors associated with every winding.

In the embodiment of FIG. 2, the poles 1 and 2 and the windings 3 have a common point 4. But instead of being directly connected to the sectors of a collector, the ends of windings 3 opposed to common point 4 are each connected to the emitter of a power transistor 8. The collectors of the three transistors 8 are connected with a first interrupted ring 9 and their bases are connected respectively with the blades of a small collector ring (or slip ring) 10. The direct current of the fixed external source 6 is applied through sliding contacts 11 and 12 between ring 9 and a second ring 13 connected to the common point 4. Another direct current, much weaker than the first one (for instance of the order of 10 milliamperes if the first one is of the order of one ampere) created by a source 14 is applied by a brush 15 to the small collector 10, possibly through the intermediate of elements such as resistors or thermistors 32 adapted to adjust the intensity of this current.

The operation of this motor is easily understood if it is considered that every transistor 8 in unblocked (and thus passes the feed current of source 6 to the winding 3 associated therewith) only when a sufficient voltage is applied to its base through brush 15 and small collector ring 10. Thus we obtain the same commutation effect as in a conventional motor but the risks of creation of sparks are considerably reduced. Of course every power transistor can be replaced by an equivalent semi-conductor element such as a thyratron-transistor or thyristor.

Figure 3:
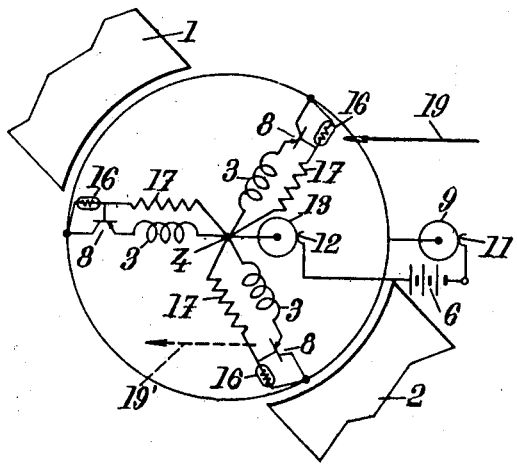
FIG. 3 is a diagrammatical view of another direct current motor according to the present invention, the feed being obtained through two uninterrupted rings without any collector ring.

The second embodiment, diagrammatically shown by FIG. 3, wholly eliminates the risks above referred to by eliminating any contact between the brushes and a non-continuous collector.

This embodiment of FIG. 3 again includes poles 1 and 2, windings 3 with a common point 4, direct current stationary source 6, transistors 8 and uninterrupted rings 9 and 13 with sliding contacts 11 and 12 connected, respectively, with the collectors of transistors 8 and with common point 4.

But the base of every transistor 8, instead of being connected to a small collector such as 10, is in this case connected on the one hand to the collector of this transistor through a photo-resistant cell 16 and on the other hand to common point 4 through a resistor 17.

Each of said cells 16 includes a photo-sensitive area 18 (FIG. 4) having for instance the shape of a cylindrical or conical (ring) or flat (disc) annular sector portion extending over 120° in the case where there are three windings as herein described by way of example.

These three areas 18 form together an annular element driven together with the rotor in such manner as to pass in front of a fixed light beam 19 capable of illuminating a small portion 20 of this annular element.

Generally speaking, the shape of parts 18 and that of beam 19 must be chosen in such manner that said beam produces an at least partial irradiation of at least one of said photo-sensitive areas whatever be the annular position of the rotor. As a matter of fact, if it were not the case for some angular position of the rotor, the motor, after having stopped in said position, could not be started again by the passage of the light beam.

For this purpose the sector-like shape may be given to the cross section of beam 19 as well as to the area 18 or to both. Any shape other than a sector-like shape can be used provided that the above mentioned condition is complied with.

The position of the light beam may be adjustable, either automatically or not, in a known manner, used for the setting of brushes, in such manner as to improve the efficiency of the motor.

Figure 4:
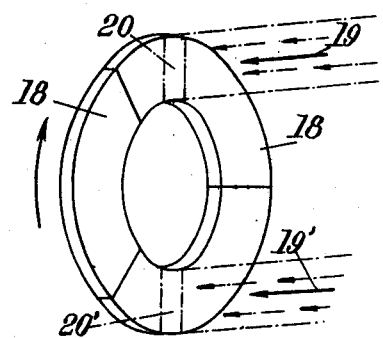
FIG. 4 is a perspective view of a detail of the motor shown by FIG. 3.

The operation of the motor of FIGS. 3 and 4 is as follows:

The direct current from source 6 is permanently applied through rings 9 and 13 between common point 4 and the collector of every transistor 8, but every transistor 8 remains blocked as long as the photo-sensitive area of the cell 16 associated therewith is not illuminated.

On the contrary, as soon as the area 20 of illumination of beam 19 is within the photo-sensitive area 18 of a cell 16, the resistance of this cell decreases sufficiently for causing the voltage then applied across it to the base of the corresponding transistor 8 to release this transistor.

The value of every resistor 17 is for this purpose comprised between the two resistance values of cells 16 corresponding respectively to illumination and lack of illumination of these cells.

Light beam 19 therefore performs exactly the function of the brush 15 of the embodiment of FIG. 2, but without any material contact.

Therefore the pressure of this light beam 19 suffices to feed the motor with direct current and therefore to cause its rotor to rotate whereas extinguishment of said beam ceases to apply a driving torque to this rotor.

But this rotor, same as that of FIG. 2, can rotate only in one direction.

To reverse the direction of revolution of the motor, it suffices to change by 180° about the axis of the motor the unblocking of the feed of the windings.

For this purpose, it suffices:

In the construction of FIG. 2, to make use of a brush which rubs upon small collector 10 in a position diametrally opposed to that of brush 15, In the construction of FIG. 3, to use a light beam 19' diametrally opposed to beam 19 and capable of irradiating an area 20' symmetrical of area 20 (with respect to the axis of the motor).

This last mentioned construction is particularly advantageous in that it permits, by acting merely upon the formation of beams 19 and 19', of producing one of the four ways of operation of the motor, to wit:

Driving of the rotor in a first direction (only beam 19 being operative),

Driving of the rotor in a direction opposed to the preceding one (only beam 19' being made operative), Blocking of the rotor (both of the beams 19 and 19' being operative), Rotor free to rotate, that is to say keeping in rotation, due to its inertia, after it has been started until it stops (both of the beams 19 and 19' being extinguished).

Figures 5, 7:
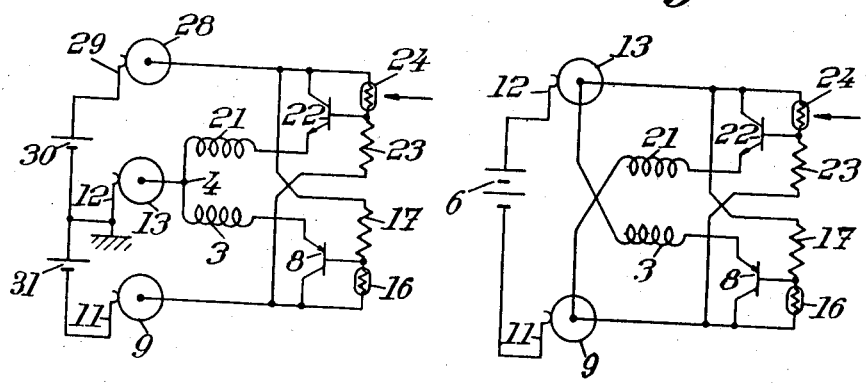
FIG. 5 is a simplified view of another direct current motor made according to the present invention, in which both directions of rotation are obtained by means of two uninterrupted rings.
FIG. 7 shows a modification of FIG. 5.

A modification of a motor capable of being driven in both directions has been illustrated diagrammatically in FIG. 5.

Figure 6:
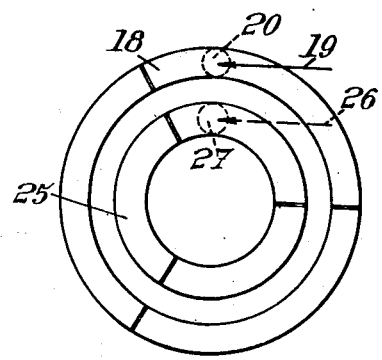
FIG. 6 is an end view of a detail of the motor of FIG. 5.

Such a motor includes, as the illustrated one, a first system of windings 3 (for instance three windings, only one of which has been shown in FIG. 5 for the sake of simplicity) each associated with a transistor 8, a cell 16 with a photo-sensitive area 18 in the form of a sector (FIG. 6) and a resistor 17; rings 9 and 13 with contacts 11 and 12; and a fixed source of direct current 6.

Said motor further comprises a second system of windings 21 mounted in such manner that, when they are fed with current, they cause the motor to rotate in a direction opposed to that corresponding to the feed of windings 3.

For this purpose, every winding 21 has one of its ends connected to ring 9 and its other end connected to the emitter of a transistor 22 of a type opposed to that of transistors 8 (that is to say of the N-P-N type in FIG. 5, transistors 8 being in this case of the P-N-P type). The collectors of transistors 22 are connected to ring 13 and the base of every transistor 22 is connected on the one hand to ring 9 through a resistor 23 and on the other hand to its collector through a photo-resistant cell 24.

The photo-sensitive areas 25 of cells 24 form a second annular surface (FIG. 6) adapted to pass, during the rotations of the rotor, in front of a light beam 26 which irradiates them along impact areas 27.

It will be really understood that, in these conditions, illumination of only beam 19 causes the rotor to be driven in one direction, illumination of only beam 26 causes the rotor to be driven in the opposed direction, illumination of both of the beams 19 and 26 blocks said rotor and extinguishment of both beams leaves the rotor wholly free to rotate.

In the modification of FIG. 7, the direct current source 6 is replaced by two sources 30 and 31 having a common point connected to the ground and the rotor includes three uninterrupted rings instead of two, to wit the two above mentioned rings 9 and 13 and a third one 28 (with a sliding contact 29). Rings 9 and 28 are fed from sources 30 and 31, respectively with a negative voltage and a positive voltage, whereas ring 13 is grounded. Instead of being connected with ring 13 as in the construction of FIG. 5, the end of resistor 17 opposed to its end connected to the base of transistor 8 is connected with ring 28. The mounting of elements 21 to 24 is modified accordingly in a wholly symmetrical manner as visible in FIG. 7. This arrangement of FIG. 7 is preferable to the preceding one in that the return resistor (17, 23) of every transistor base, leads to a polarity opposed to the nominal polarity of this base, which ensures a perfect blocking of said transistor in the absence of irradiation of the corresponding cell (16, 24).

As the variation of resistance of cells 16 and 24 is a function of the luminous intensity of the beams that illuminate them, as furthermore the intensity of the current flowing from the emitter to the collector of a transistor (and therefore through the winding connected with said emitter) depends upon the resistance of the cell (16 or 24) mounted between its base and its collector, and as, finally, the speed of revolution of the motor varies in the same direction as the intensity of the current flowing through the windings of its rotor, it suffices to vary the luminous intensity of beam 19 (and/or 19′ and/or 26) to vary the speed of revolution of the motor.

This gives a particular resilient manner for adjusting the speed of revolution, which may of course be used both in the case of motors having a single direction of revolution (comprising a single annular succession of photosensitive areas) and in the case of motors having two directions of circulation. It should be noted that this control of the speed of revolution is performed without dissipation of eneregy since the cells the variations or resistance of which are taken advantage of for said control are located in "pilot" circuits through which low currents flow instead of being located in power circuits.

Such an arrangement might also be used for comparing the intensity of two light sources, in particular by giving identical dimensions, shapes and characteristics to both of the above mentioned annular juxtapositions of photosensitive areas 18 and 24 and by illuminating these two annular juxtapositions with said two sources. The motor remains at rest only if both sources have the same intensity and, if this is not the case, it rotates in the direction corresponding to the higher luminosity, the quicker as the difference between the two luminosities to be compared is greater.

In the case where two beams are used simultanously, it is also possible to have the luminous intensity of one of these two beams variable in accordance with the rotation of the rotor so as automatically to make it equal to the luminous intensity of the other beam, this equality being obtained when the rotor stops.

The light used to constitute light beams 20 and 26 may be either monochromatic or polychromatic, continuous, modulated and/or polarized (and, in these two last mentioned cases, associated with corresponding filter means), either non-coherent or coherent (laser).

Likewise radiations other than light radiations might be used, for instance infra-red radiations, ultra-violet radiations, X-rays, electromagnetic radiations, ultra-sound radiations, hyper-sound radiations, or corpuscular radiations.

Every sensitive area might be irradiated simultaneously by several beams directed toward it, for instance by two laser beams of different colors the intensity of at least one of which could be controlled by the interposition of a photometric wedge thus acting as a "luminous rheostat."

The embodiments which will now be described with reference to FIGS. 8 to 14 relate to motors wherein the windings are located on the stator, the magnetic field being produced by a permanent magnet 1–2 which belongs to the rotor.

In these embodiments, transistors 8 associated with windings 3 (only one of which has been shown in FIGS. 8 and 9 for the sake of clarity) are carried by the fixed portion of the motor, which may be advantageous, chiefly for high speed of revolution.

In FIG. 8, the following elements of FIG. 2 are to be found:

Small collector 10 (in this case stationary) every blade of which is connected to a base of transistor 8, brush 15 (in this case driven in rotation together with the rotor), current sources 6 and 14, adjustment resistor 32. The construction of FIG. 8 also includes an uninterrupted ring 33 with a sliding brush 34 to connect brush 15 with source 14.

It will be seen that it is always the very weak current for controlling source 14 which flows through rotary brush 15 and that this brush successively controls the unblocking of the feed of respective windings 3.

FIG. 9 shows an embodiment including the following elements of FIG. 3: source 6, cell 16 and resistor 17. But in this case, light beam 35 is not stationary. It is driven in rotation together with the rotor.

A particularly advantageous way of producing such a rotary light beam 35 consists in creating a light beam 36 (FIGS. 10 and 11) directed along the axis of the motor and in deflecting it by means of one or several mirrors or prisms 37 and 38 at least one of which 37 rotates together with the rotor, said mirrors being directed in such manner that the finally reflected beam 35 successively scans the photosensitive areas 18, which in this case are stationary. The first mirror 37 which deflects axial beam 36 may be mounted inside an axial passage provided in the rotor opposite a lateral opening for the passage of the beam reflected by it.

The second mirror 38 may be fixed and of revolution about the axis of the rotor, which might be advantageous for high speeds of revolution.

The construction of the motor illustrated by FIG. 12 is of the same type as that illustrated by FIG. 9, but the number of photo-sensitive areas 18 has been much increased from some units to several tens of units. These areas are distributed side by side along a common circumference and each of them is associated, as above described, to a winding 3 and a semi-conductor control element.

Windings 3 are distributed radially about the axis of the motor and the rotor-magnet unit 1–2 of this motor tends to be in line at any time with the winding the area 18 of which is irradiated at this time.

This machine may be used as a "synchro-transmitter" or "selsyn," that is to say to reproduce at a distance the angular position of a control rotary member capable of creating or transmitting a light beam which scans the succession of areas 18. We thus dispose of a device for displacing or adjusting at will, by means of an immaterial radiation, a part located at a distance.

In order to increase the accuracy of the tele-controlled reproduction thus obtained, the section of impact of the light beam on the areas should be given a width at least equal to that of an area, these areas being juxtaposed to each other without interval between them, and the semiconductor elements should be chosen in such manner that their conduction is a progressive function of the degree of illumination of the areas associated therewith. Thus, the position of the rotor magnet unit 1–2 may be determined with an accuracy greater than the angular interval between two successive areas. In particular if the area of impact of the light beam is centered upon the line of separation of two successive areas, the magnetic axis of the rotor magnet unit is directed along the bisector of the axis of the two windings respectively associated with these two areas.

Areas 18 may have any desired shape. For instance, their lines of separation 48 may be oblique to the circumference along which they are disposed, as visible in FIG. 13, which improves the progressivity of energizing of the corresponding windings 3 and therefore the accuracy of reproduction by the rotor and magnet unit.

Of course, analogous effects might be obtained by giving the cross section of the light beam itself a particular shape (in the form of a sector, of a lozenge, etc.).

The construction diagrammatically illustrated by FIG. 14 also relates to a motor of the type illustrated by FIG. 9 but, in this case, energizing of the different semi-conductor elements 8 associated with windings 3 is ensured, from the temporary irradiations of a single photo-sensitive area 18, through as many bistable trigger circuits 14 which are controlled from one to the next one.

In other words, each of the successive electrical pulses produced from luminous sparks 42 coming from an intermittently working source 43 and striking said area 18 causes successive triggerings, in opposed directions, of two successive bistable trigger circuits 49 (that corresponding to the winding 3 that is fed with current at this time and the next one) in such manner as to deenergize the energized element 8 and to energize the next one, which causes the rotor and magnet unit 1–2 to rotate through one step.

We thus dispose of telecontrolled counting or display means transforming from a distance a given number of light pulses into proportional angular displacements. Of course, the rotor of this system may be provided with any demultiplying and displaying means as may be necessary.

Instead of making use of bistable trigger circuits, that is to say of circuits capable of shifting from each of their two stable states to the other one under the effect of an electric pulse, we may make use of monostable trigger circuits capable of shifting from a first stable state under the influence of a pulse and then of automatically returning to this first state after a well determined and possibly adjustable time.

In such a case, the respective monostable trigger circuits are mounted in such manner that each of them controls the next one. It suffices in this case to send a radiation pulse onto area 18 (which is then associated with a single trigger circuit) to cause the motor to rotate at a predetermined speed.

This speed of revolution may be adjusted at will by varying the lag of every trigger circuit, for instance by modifying from a distance the illumination of a photosensitive element constituting the resistor of a resistor-capacity circuit of this trigger device, which lag may be the same for all the trigger circuits (in which case said element may be common to all the trigger circuits) or may vary from a trigger circuit to the next one.

We may also replace every bistable trigger circuit by a monostable multivibrator capable of energizing the winding associated therewith for a time proportional to the amplitude of the voltage applied thereto.

In this case, the irradiation, which is transformed into such a control voltage, may be continuous and its variations of intensity are automatically transformed into variations of the speed of revolution of the motor.

It is known that many direct current electric motors may work as a dynamo when their rotors are driven in rotation.

This is the case of the motors above described.

Of course, in this case, the main source of direct current (such as 6, FIGS. 2 and 3) is replaced by an exploitation circuit and the auxiliary control current, instead of being supplied by an auxiliary source (such as 14, FIG. 2) may consist of a portion of the current produced by the dynamo itself.

Of course, the different windings of the machines, instead of being connected in star-like fashion, might be connected in triangle fashion.

Obviously, the number of windings may be different from three.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A direct current dynamoelectric motor which comprises, in combination:

a rotor and a stator, star-connected windings carried by said stator, a semi-conductor element for each winding, each semi-conductor element having three electrodes, one of which is a control electrode, the other two electrodes of each semi-conductor element and the corresponding winding being permanently connected in series with a first source of direct current, means for temporarily connecting, in an intermittent manner, each control electrode to a source of direct current smaller than said first source, said means including, on the one hand, disposed in series with each control electrode, a corresponding responsive element whose impedance varies in response to the radiation that it receives, and on the other hand, independent of said motor and disposed at a distance from said motor, radiation-producing means for directing radiation onto said responsive elements, said responsive elements being mounted on a common circle on the stator of the motor, the number of said responsive elements and hence the number of semi-conductor elements and of windings corresponding to the responsive elements being greater than ten but less than one hundred, and the radiation-producing means being arranged to scan successively the responsive elements, which compels the rotor of the motor to occupy at any time the position determined by the radiation at said time.

2. An electric motor according to claim 1 wherein said radiation-producing means comprises a laser.

3. An electric motor according to claim 1 wherein said responsive elements present, respectively and successively on the trajectory of the radiation, areas responsive to the radiation, said responsive areas being identical and adjoining each other, the radiation being at least as wide as every area.

4. An electric motor according to claim 3 wherein the areas are shaped in such manner as to gradually substitute themselves for one another on the trajectory of the radiation when this radiation is displaced to scan successively said areas.

References Cited

UNITED STATES PATENTS

| | | | |
|---|---|---|---|
| 3,023,348 | 2/1962 | Cox | 318—138 |
| 3,096,467 | 7/1963 | Angus et al. | 318—254 |
| 3,131,341 | 4/1964 | Kniazeff | 318—138 |
| 3,204,165 | 8/1965 | Kreutzer | 318—138 |
| 3,239,741 | 3/1966 | Rank | 317—130 |
| 3,299,335 | 1/1967 | Wessels | 318—138 |
| 3,319,104 | 5/1967 | Yasuoka | 318—138 |
| 3,350,615 | 10/1967 | Lindner | 318—138 |
| 3,328,662 | 6/1967 | Gambill | 318—313 |
| 3,366,862 | 1/1968 | Beck et al. | 318—313 |

G. R. SIMMONS, Primary Examiner

U.S. Cl. X.R.

318—254